(12) United States Patent
Ben Trad et al.

(10) Patent No.: US 11,125,007 B2
(45) Date of Patent: Sep. 21, 2021

(54) ASYMMETRICAL VACUUM-INSULATED GLAZING UNIT

(71) Applicants: AGC GLASS EUROPE, Louvain-la-Neuve (BE); AGC INC., Chiyoda Ku (JP); AGC FLAT GLASS NORTH AMERICA, INC., Alpharetta, GA (US); AGC VIDROS DO BRASIL LTDA, Sao Paulo (BR)

(72) Inventors: Abderrazek Ben Trad, Woluwe Saint-Lambert (BE); Julien Jeanfils, Corbais (BE); Pierre Schneider, Saint Christophe sur le Nais (FR)

( * ) Notice: Subject to any disclaimer, the term of this patent is extended or adjusted under 35 U.S.C. 154(b) by 0 days.

(21) Appl. No.: 17/043,948

(22) PCT Filed: May 13, 2019

(86) PCT No.: PCT/EP2019/062180
§ 371 (c)(1),
(2) Date: Sep. 30, 2020

(87) PCT Pub. No.: WO2019/219590
PCT Pub. Date: Nov. 21, 2019

(65) Prior Publication Data
US 2021/0054683 A1 Feb. 25, 2021

(30) Foreign Application Priority Data
May 14, 2018 (EP) ..................... 18172117

(51) Int. Cl.
*E06B 3/66* (2006.01)
*E06B 3/663* (2006.01)
*E06B 3/67* (2006.01)

(52) U.S. Cl.
CPC .......... *E06B 3/6617* (2013.01); *E06B 3/6612* (2013.01); *E06B 3/66304* (2013.01); *E06B 3/66309* (2013.01); *E06B 3/6715* (2013.01)

(58) Field of Classification Search
CPC .... E06B 3/6617; E06B 3/6612; E06B 3/6715; E06B 3/66309; E06B 3/366304; Y02B 80/22; Y02A 30/249
See application file for complete search history.

(56) References Cited

U.S. PATENT DOCUMENTS

2004/0081775 A1* 4/2004 Martin ................ E06B 3/66328
428/34
2008/0026166 A1 1/2008 Pilloy

FOREIGN PATENT DOCUMENTS

WO  WO 2005/012202 A1  2/2005
WO  WO 2013/008724 A1  1/2013

OTHER PUBLICATIONS

International Search Report dated May 31, 2019 in PCT/EP2019/062180 filed on May 13, 2019.

* cited by examiner

*Primary Examiner* — Donald J Loney
(74) *Attorney, Agent, or Firm* — Oblon, McClelland, Maier & Neustadt, L.L.P.

(57) ABSTRACT

A vacuum insulating glazing unit is described. The vacuum insulating glazing unit has a first glass pane and a second glass pane; a set of discrete spacers positioned between the first and second glass panes, maintaining a distance between the first and the second glass panes; a hermetically bonding seal sealing the distance between the first and second glass panes over a perimeter thereof; an internal volume defined by the first and second glass panes and the set of discrete spacers and closed by the hermetically bonding seal, where the internal volume has an absolute vacuum pressure of less than 0.1 mbar; and an absolute difference between a coefficient of thermal expansion of the first glass pane and a coefficient of thermal expansion of the second glass pane is at most $0.40*10^{-6}/°$ C.

14 Claims, 5 Drawing Sheets

|  | Symmetric VIG configuration (Comparative) | | Asymmetric VIG Configuration (Comparative) | |
| --- | --- | --- | --- | --- |
| Thickness | Z1=5mm | Z2=5mm | Z1=7mm | Z2=3mm |
| Pitch | λ = 32 mm | λ = 32 mm | λ = 32 mm | λ = 32 mm |
| Ratio Z1/Z2 | 1 | | 2.33 | |
| Thermal stress | $\sigma_{\Delta T}$ = 0 MPa | $\sigma_{\Delta T}$ = 9.15 MPa | $\sigma_{\Delta T}$ = 0 MPa | $\sigma_{\Delta T}$ = 2.16 MPa |
| Atmospheric stress | $\sigma_p$ = 4.50 MPa | $\sigma_p$ = 4.50 MPa | $\sigma_p$ = 2.30 MPa | $\sigma_p$ = 12.51 MPa |
| Combined stress | $\sigma_{comb}$ = 4.50 MPa | $\sigma_{comb}$ = 13.65 MPa | $\sigma_{comb}$ = 2.30 MPa | $\sigma_{comb}$ = 14.67 MPa |

Fig. 4

|  | Symmetric VIG configuration (Comparative) | | Asymmetric VIG Configuration (Comparative) | |
|---|---|---|---|---|
| Thickness | Z1=5mm | Z2=5mm | Z1=8mm | Z2=2mm |
| Pitch | λ = 26 mm | λ = 26 mm | λ = 26 mm | λ = 26 mm |
| Ratio Z1/Z2 | 1 | | 4 | |
| Thermal stress | $\sigma_{\Delta T}$ = 0 MPa | $\sigma_{\Delta T}$ = 8.01 MPa | $\sigma_{\Delta T}$ = 0 MPa | $\sigma_{\Delta T}$ = 0 MPa |
| Atmospheric stress | $\sigma_p$ = 2.97 MPa | $\sigma_p$ = 2.97 MPa | $\sigma_p$ = 1.16 MPa | $\sigma_p$ = 18.59 MPa |
| Combined stress | $\sigma_{comb}$ = 2.97 MPa | $\sigma_{comb}$ = 10.98 MPa | $\sigma_{comb}$ = 1.16 MPa | $\sigma_{comb}$ = 18.59 MPa |

Fig. 5

ASYMMETRICAL VACUUM-INSULATED GLAZING UNIT

1. FIELD OF THE INVENTION

The invention relates to a vacuum-insulated glazing unit wherein the glass panes are of different thicknesses.

2. BACKGROUND OF THE INVENTION

Vacuum-insulated glazing units are recommended because of their high-performance thermal insulation. A vacuum-insulated glazing unit is typically composed of at least two glass panes separated by an internal space in which a vacuum has been generated. In general, in order to achieve a high-performance thermal insulation (Thermal transmittance, U, being U<1.2 W/m²K) the absolute pressure inside the glazing unit is typically 0.1 mbar or less and generally at least one of the two glass panes is covered with a low-emissivity layer. To obtain such a pressure inside the glazing unit, a hermetically bonding seal is placed on the periphery of the two glass panes and the vacuum is generated inside the glazing unit by virtue of a pump. To prevent the glazing unit from caving in under atmospheric pressure (due to the pressure difference between the interior and exterior of the glazing unit), discrete spacers, also referred to as pillars, are placed between the two glass panes.

Vacuum-insulated glazing units need to be carefully dimensioned to resist to different external stresses. Major external stresses to be considered in dimensioning specifically vacuum-insulated glazing unit are the thermal stress induced by a temperature difference between exterior and interior environments and the atmospheric pressure induced stress.

The glass pane facing the interior environment, takes up a temperature similar to the temperature of the interior environment and the glass pane facing the exterior environment, takes up a temperature similar to the temperature of the exterior environment. In most stringent weather conditions, the difference between the interior and exterior temperatures can reach up to 40° C. and more. The temperature difference between the interior and exterior environments may cause an induced thermal stress inside the glass panes. In some severe cases, for instance, when the temperature difference is 40° C., the induced thermal stress may fracture the vacuum-insulated glazing. To resist this induced thermal stress, different solutions have been provided in the art such as increasing the thickness of both glass panes. Another solution is proposed in JP2001316137 which addresses how to improve vacuum-insulated glazing unit so that no deformation or distortion occurs even if the glass panes are hit by strong sunlight. JP2001316137 teaches to design a glazing wherein the inner glass pane disposed on the indoor side is thicker than the outer glass pane. In contrast, JP2001316138 teaches the opposite VIG construction wherein the outer glass pane disposed on the outdoor side is thicker than the inner glass pane, for improved shock resistance and acoustic.

However, none of the art addresses the technical problem of improving the resistance to induced thermal stress in vacuum-insulated glazing units wherein glass panes are subjected to temperature difference between exterior and interior environments. Furthermore, none of the art addresses the technical problem of atmospheric pressure induced stress at the pillar locations and even less how to design a vacuum-insulated glazing unit demonstrating improved resistance to this combined external stresses while maintaining high performance thermal insulation.

3. SUMMARY OF THE INVENTION

The present invention relates to a vacuum insulating glazing unit (VIG) extending along a plane, P, defined by a longitudinal axis, X, and a vertical axis, Z and having a width, W, measured along the longitudinal axis, X, and a length, L, measured along the vertical axis, Z. The length of the VIG, L, is equal to or greater than 300 mm, (L≥300 mm). Such VIG comprises:

a) A first glass pane having a thickness $Z1$, and a second glass pane having a thickness, $Z2$, wherein $Z1$ is greater than $Z2$ ($Z1>Z2$); wherein the thicknesses are measured in the direction normal to the plane, P. The thickness of the second glass pane, $Z2$, is equal to or greater than 3 mm, ($Z2≥3$ mm) and the thickness ratio, $Z1/Z2$, of the thickness of the first glass pane, $Z1$, to the thickness of the second glass pane, $Z2$, is equal to or greater than 1.30 ($Z1/Z2≥1.30$), and greater than $Z1/(Z1-2.10)$ ($Z1/Z2>Z1/(Z1-2.10)$).

The first glass pane and the second glass pane are float annealed glass panes. The first glass pane has a coefficient of thermal expansion, CET1, and the second glass pane has a coefficient of thermal expansion, CET2, and the absolute difference between CET1 and CET2 is at most 0.40 $10^{-6}$/° C. (|CET1−CET2|≤0.40 $10^{-6}$/° C.)

b) A set of discrete spacers positioned between the first and second glass panes, maintaining a distance between the first and the second glass panes and forming an array having a pitch, λ. The pitch, λ, is comprised between 10 mm and 26 mm (10 mm≤λ≤26 mm).

c) A hermetically bonding seal sealing the distance between the first and second glass panes over a perimeter thereof.

d) An internal volume, V, defined by the first and second glass panes and the set of discrete spacers and closed by the hermetically bonding seal and wherein there is a vacuum of absolute pressure of less than 0.1 mbar.

The present invention further relates to a partition separating a first space with a first temperature, Tempt, from a second space with a second temperature, Temp2, wherein Temp 1 is lower than Temp2. Said partition comprises an opening being closed by a vacuum insulating glazing unit according to the present invention, wherein preferably the first glass pane is facing the first space. The present invention further relates to the use of a vacuum insulated glazing unit according to the present invention to close the opening of such partition.

Other aspects and advantages of the embodiments will become apparent from the following detailed description taken in conjunction with the accompanying drawings which illustrate, by way of example, the principles of the described embodiments.

4. BRIEF DESCRIPTION OF THE DRAWINGS

Figure 3:
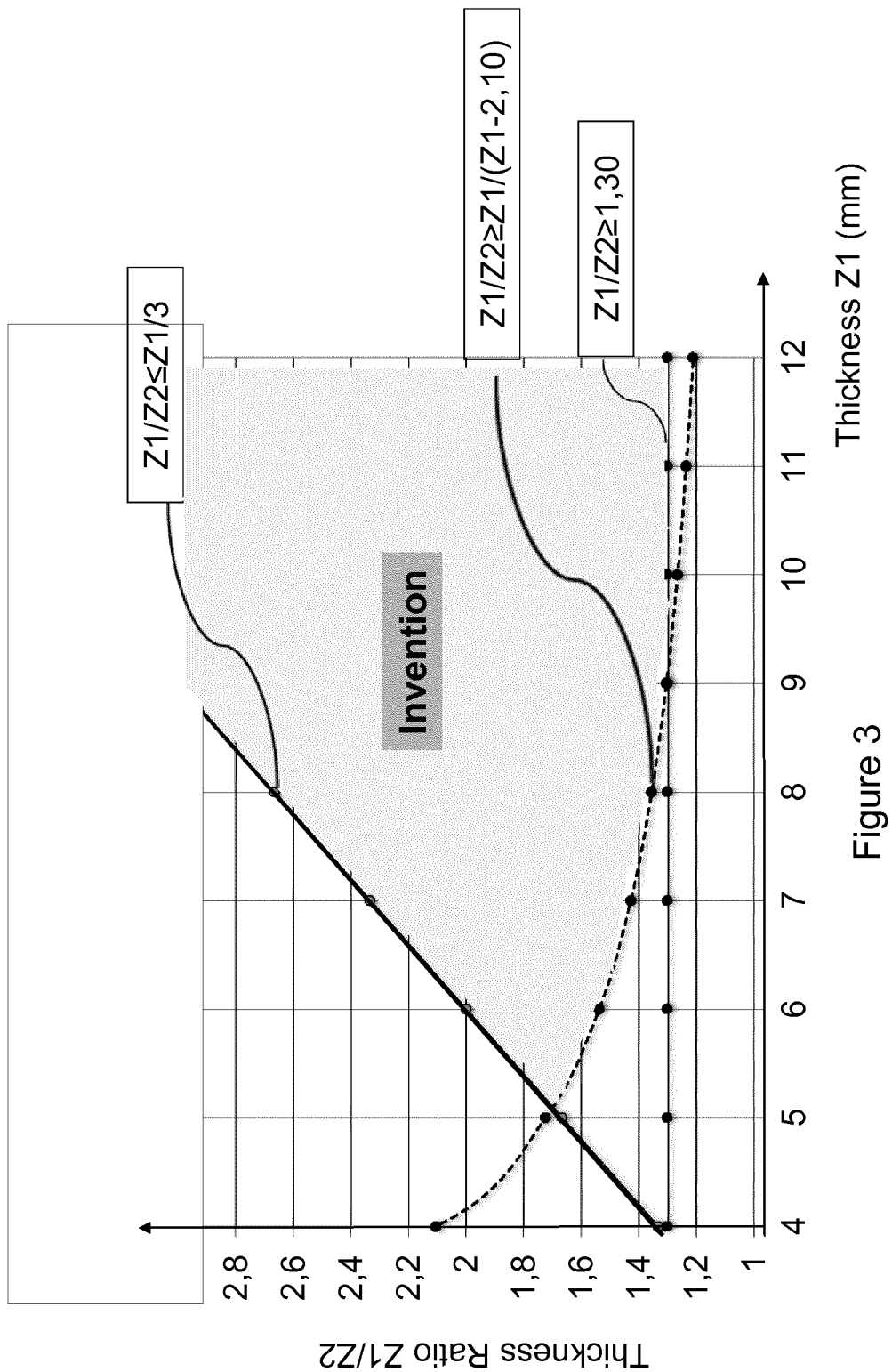

FIG. 3 in the shaded area illustrates the values of the ratio $Z1/Z2$ in function of $Z1$, according to the invention.

FIG. 4 is a table showing the maximum combined stress for different symmetric and asymmetric VIG configurations.

FIG. 5 is a table showing the maximum combined stress for different symmetric and asymmetric VIG configurations.

5. DETAILED DESCRIPTION OF THE INVENTION

It is an object of the present invention to provide a vacuum-insulated glazing unit (hereinafter referred as VIG) which demonstrates high performance thermal insulation and improved resistance to the combination of stresses induced by a temperature difference between interior and exterior environments and by atmospheric pressure.

It has been surprisingly found that the vacuum-insulated glazing unit of the present invention when asymmetric, i.e. wherein a first glass pane is thicker than a second glass pane ($Z1>Z2$), and characterized by a specific thickness ratio ($Z1/Z2$) and further carefully dimensioned by a specific size (L), specific thickness of the second glass pane ($Z2$) and a specific interval between the spacers ($\lambda$), provides better combined stress resistance than the corresponding symmetric vacuum-insulated glazing, of the same overall thickness.

The vacuum-insulated glazing unit of the present invention will be hereinafter referred to as the "asymmetric VIG".

The invention relates to a vacuum-insulated glazing unit typically comprising a first glass pane and a second glass pane that are associated together by way of set of discrete spacers that holds said panes a certain distance apart, typically in the range comprised between 50 μm and 1000 μm, preferably between 50 μm and 500 μm and more preferably between 50 μm and 150 μm and, between said glass panes, an internal space comprising at least one first cavity, in which cavity there is a vacuum where the absolute pressure is less than 0.1 mbar, said space being closed with a peripheral hermetically bonding seal placed on the periphery of the glass panes around said internal space.

Figure 1:
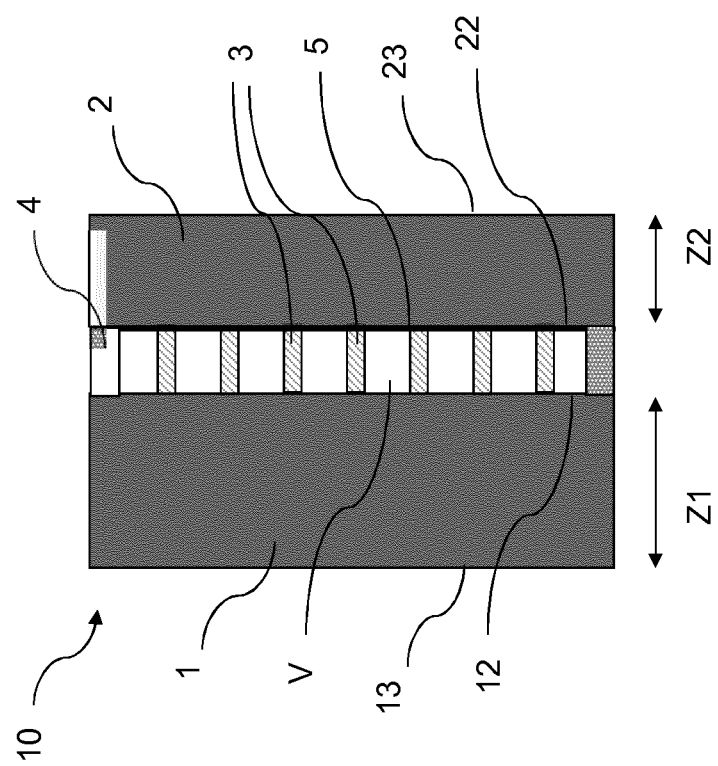
FIG. 1 shows a cross sectional view of a vacuum-insulated glazing unit according to one embodiment of the present invention.

The present invention relates to a vacuum insulating glazing unit (10) extending along a plane, P, defined by a longitudinal axis, X, and a vertical axis, Z, and having a width, W, measured along the longitudinal axis, X, and a length, L, measured along the vertical axis, Z. The length, L, of the asymmetric VIG of the present invention, is equal to or greater than 300 mm, (L≥300 mm). In a preferred embodiment, the length of the asymmetric VIG, L, is equal to or greater than 400 mm, (L≥400 mm), preferably is equal to or greater than 500 mm, (L≥500 mm). In a further preferred embodiment, the width of the asymmetric VIG of the present invention, W, is equal to or greater than 300 mm, (W≥300 mm), preferably is equal to or greater than 400 mm, (W≥400 mm), more preferably is equal to or greater than 500 mm, (W≥500 mm), As illustrated in FIG. 1, the asymmetric VIG (10) of the present invention comprises:
a) a first glass pane (1) having a thickness $Z1$, and a second glass pane (2) having a thickness, $Z2$, wherein the thicknesses are measured in the direction normal to the plane, P;
b) a set of discrete spacers (3) positioned between the first and second glass panes and maintaining a distance between the first and the second glass panes and forming an array having a pitch, $\lambda$;
c) a hermetically bonding seal (4) sealing the distance between the first and second glass panes over a perimeter thereof;
d) an internal volume, V, defined by the first and second glass panes and the set of discrete spacers and closed by the hermetically bonding seal and wherein there is a vacuum of absolute pressure is less than 0.1 mbar.

Within the present invention, $Z1$ is greater than $Z2$ ($Z1>Z2$) so that the thickness ratio, $Z1/Z2$, of the thickness of the first glass pane, $Z1$, to the thickness of the second glass pane, $Z2$, is equal to or greater than 1.30 ($Z1/Z2≥1.30$) and fulfills the equation: $Z1/Z2>Z1/(Z1-2.10)$. In a preferred embodiment, the thickness ratio, $Z1/Z2$, is equal to or greater than 1.55 ($Z1/Z2≥1.55$), preferably is comprised between 1.60 and 6.00 ($1.60≤Z1/Z2≤6.00$), preferably between 2.00 and 4.00 ($2.00≤Z1/Z2≤4.00$).

Within the present invention, the thickness of the second glass pane, $Z2$, of the asymmetric VIG, is equal to or greater than 3 mm ($Z2≥3$ mm). Typically, the thickness of the second glass pane, $Z2$, could be equal to or greater than 4 mm, ($Z2≥4$ mm), equal to or greater than 5 mm, ($Z2≥5$ mm), and even equal to or greater than 6 mm, ($Z2≥6$ mm) and will be no more than 10 mm, preferably no more than 8 mm. However, in order to improve the resistance to thermal induced stress, it is preferred to keep the thickness of the second pane, $Z2$, to a minimum.

Within the present invention, the interval between the discrete spacers positioned between the first and second glass panes and maintaining a distance between the first and the second glass panes, also referred to as the pitch, $\lambda$, is comprised between 10 mm and 26 mm (10 mm≤$\lambda$≤26 mm), preferably the pitch is comprised between 15 mm and 25 mm (15 mm≤$\lambda$≤25 mm), more preferably between 20 mm and 24 mm (20 mm≤$\lambda$≤24 mm).

The present invention is based on the surprising finding that an optimum resistance to the combined thermal induced stress and the atmospheric induced stresses can be achieved via a carefully dimensioned asymmetric VIG configuration.

For the purpose of the present invention of designing asymmetric VIGs, only the tensile stress on the outer pane faces of the glass panes has been considered. Indeed, as known by person skilled in the art, it is the tensile stress that may cause cracks into the glass panes up to the fracture point. Moreover, only the tensile stress on the outer pane faces are considered. The outer pane faces are the faces of the glass panes that are facing the exterior of the VIG. The internal volume, V, of the VIG is under vacuum and therefore is essentially free of water. It is well known by person skilled in the art that the inner pane faces, i.e. those facing the internal volume, V, of the VIG, are substantially more mechanically resistant in absence of water vapour.

Thermal Induced Stress

Thermal induced stress occurs as soon as there is a temperature difference between the first glass pane (1, T1) and the second glass panes (2, T2) and increases with increasing differences between T1 and T2. The temperature difference (ΔT) is the absolute difference between the mean temperature, T1, calculated for the first glass pane (1) and the mean temperature, T2, calculated for the second glass pane (2). The mean temperature of a glass pane is calculated from numerical simulations known by the skilled person in the art. Thermal induced stress becomes even more problematic—up to breaking the VIG, when such absolute temperature difference between the glass panes reaches 30° C. and even more when the absolute temperature difference is higher than 40° C. in severe conditions. The temperature of the interior environment is typically from 20 to 25° C. whereas the temperature of the exterior environment can extend from −20° C. in the winter to +35° C. in the summer. Therefore, the temperature difference between the interior environment and the exterior environment can reach more than 40° C. in severe conditions. Therefore, the temperature difference (ΔT) between the mean temperature, T1, calculated for the first glass pane (1) and the mean temperature, T2, calculated for the second glass pane (2) can reach more than 40° C. as well.

The thermal induced stress has been calculated at a ΔT=40° C., representative of the severe conditions, and when the mean temperature of the first pane is lower than the mean temperature of the second pane (T1<T2).

The present invention is based on the surprising finding that reduced thermal induced stress can be achieved via a carefully dimensioned asymmetric VIG configuration wherein the ratio Z1/Z2 of the thickness of the first glass pane, Z1, to the thickness of the second glass pane, Z2, should be equal or greater than 1.30 (Z1/Z2≥1.30) and greater than Z1/(Z1−2.10) and wherein the second pane has a thickness Z2 equal to or greater than 3 mm (Z2≥3 mm).

Figure 2:
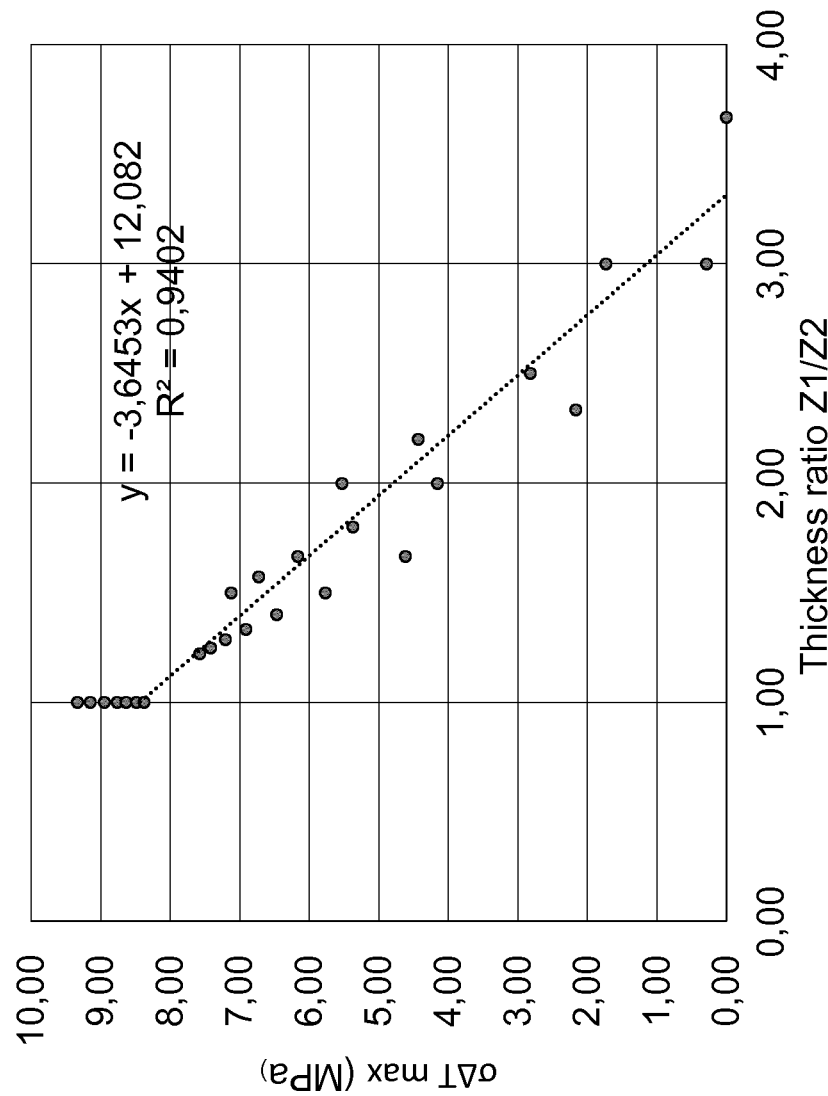
FIG. 2 shows the finite element modelling results of the correlation of the maximum thermal stress (σΔT Max) calculated on the glass panes at ΔT=40° C. and T1<T2, as a function of the $Z1/Z2$ thickness ratio.

It has been further found that the higher the thickness ratio is, the greater is the thermal induced stress reduction as illustrated in FIG. 2 showing the finite element modelling results of the correlation of the maximum thermal stress (σΔT Max) calculated on the glass panes at ΔT=40° C. and T1<T2, as a function of the Z1/Z2 thickness ratio.

In FIG. 2, the maximum induced thermal stress value is the highest value obtained for the first and second glass panes. The thermal stress is calculated at the following conditions:
- Temperature: ΔT=40° C. ΔT is calculated as the temperature difference between the mean temperature of the first glass pane, T1, and the mean temperature of the second glass pane, T2 wherein the mean temperature of the first pane is lower than the mean temperature of the second pane (T1<T2);
- The length, L of the asymmetric VIG is 1000 mm and the width, W, is 1000 mm.
- The pillars are placed on a regular square array.
- Glass panes are float annealed glass panes made of soda-lime silica glass with coefficient of thermal expansion, CTE, CTE=8.5 $10^{-6}$/° C., a Young's modulus, E, E=70 GPa and a Poisson's ratio, μ, μ=0.21;
- The experimental VIG has been tested with unconstraint edges, i.e. not positioned within an additional window frame.

Thermal induced stress (σΔT) is the stress induced on the glass panes of the VIG when said glass panes are exposed to different temperature conditions. Numerical simulation is used to calculate thermal stress on each glass panes of the VIG. A finite element analysis (FEA) model by commercial software Abaqus2017 (formerly referred to by ABAQUS) has been built to stimulate the behaviour of a VIG when exposed to different temperature conditions. The calculations were achieved with glass panes being meshed using C3D8R elements with 5 integrations points on glass thickness. The global mesh size used was 1 cm. In order to achieve the ΔT of the present invention, initial and uniform temperature was imposed on both glass panes then uniform temperature variation has been imposed on one of the glass pane, while maintaining the other glass pane at the initial temperature. Mechanical coupling was imposed between the two glass panes to force equal displacement of the two touching glass surfaces. Other boundary conditions have been set to prevent rigid body motion of the assembly. The thermal stress induced by the temperature difference has been calculated on each glass pane and the highest of the two is taken as the maximum and is expressed in MPa.

FIG. 3 illustrates graphically the Z1/Z2 thickness ratio as a function of Z1 measured on the glass panes. The shaded area represents the specifically required asymmetry of the VIG of the present invention wherein Z1/Z2≥1.30, meets the equation Z1/Z2>Z1/(Z1−2.10) and wherein Z1/Z2≤Z1/3 as per the requirement that the thickness of the second pane, Z2, must be equal to or greater than 3 mm (Z2≥3 mm). As will be shown in the following examples, the asymmetric VIG of the present invention provides substantially reduced maximum thermal induced stress on the glass panes versus the corresponding symmetric VIG of the same overall thickness (Z1+Z2). The higher the thickness ratio Z1/Z2, the better is the reduction of the maximum thermal induced stress.

The Atmospheric Pressure Induced Stress

In addition to the thermal induced stress, one must consider as well the atmospheric pressure induced stress to dimension a VIG with high-performance thermal insulation. Because of the vacuum maintained between the two panes of the VIG, the atmospheric pressure causes permanent tensile stresses at the external surfaces of the glass panes of the VIG at each pillar location. It is known by the skilled person that for small pillars, the tensile stress induced by the pillars at the external surfaces of the glass panes is independent of the size of its external circumference. By small pillars, it is generally meant pillars having a contact surface to the glass pane, defined by its external circumference, equal to or lower than 5 mm², preferably equal to or lower than 3 mm², more preferably equal to or lower than 1 mm². In those instances and for regular arrays based on an equilateral triangular, square or hexagonal scheme, this atmospheric pressure induced stress also referred to as tensile stress, can be calculated by the following formula:

$$\sigma_p \leq 0.11 \times \lambda^2/t^2 \text{ [MPa]}$$

wherein λ [m] and t [m] are respectively, the pitch between the spacers and the glass panes thickness. By "pitch", it is meant the shortest distance separating a given spacer from any of its neighbours. In particular, for square based regular arrays, the tensile stress is maximum and therefore follows the following formula: $\sigma_p=0.11 \times \lambda^2/t^2$ [MPa].

It has been found that introducing asymmetry within a VIG provides reduced thermal induced stress, but can negatively impact the performance of the asymmetric VIG in terms of resistance to the stress induced by the atmospheric pressure at the pillars locations. This deterioration is caused mainly by the fact that the second glass pane of the asymmetric VIG is thinner than the glass panes within the corresponding symmetric VIG which has the same total thickness.

Combined Stress

Asymmetric Vs Symmetric (Ratio)

Configuring an asymmetric VIG wherein the ratio Z1/Z2 of the thickness of the thicker glass pane, Z1, to the thinner glass pane, Z2, should be equal or greater than 1.30 (Z1/Z2≥1.30) and greater than Z1/(Z1−2.10) is excellent in significantly reducing the thermally induced stress (FIG. 2) but can be detrimental to the atmospheric pressure induced stress which increases significantly at the surface of the second pane. However, it has been surprisingly found that by carefully dimensioning the asymmetric VIG by defining a minimum second pane thickness, a minimum length and a maximum pitch as per present invention, a beneficial compromise can be found between the resistance to thermal induced stress and atmospheric pressure induced stress.

Therefore, it is the combined stress being the combination of thermal induced stress and atmospheric pressure induced stress that needs to be considered when dimensioning a VIG. The term "combined stress" or "the combination of stresses"

is understood to mean the sum of the thermal induced stress and the atmospheric pressure induced stress. It has been found that an asymmetric VIG designed as per invention will demonstrate a reduced combined stress versus the corresponding symmetric VIG. Therefore, VIG of greater dimensions and/or resisting at greater temperature differences, can be designed while maintaining excellent thermal insulation.

Indeed, the sufficient natural illumination of interior spaces, especially buildings, is one of the key parameters for creating pleasant and healthy environment for people. The daylight is the most interesting source of such illumination and it is important to have some transparent parts in building envelopes, to bring this light to the interior of the building. Therefore, there is a trend in the market to increase the size of the windows and transparent doors while requesting high-performance insulation. Consequently, there is a demand to increase the size of vacuum-insulated glazing. To sustain such large dimensions, it is preferred to increase the minimal thickness of the first pane, to sustain weight load as well as to provide more flexibility in increasing the thickness ratio between the first and second glass panes and thereby providing improved resistance to thermal stress.

The first glass pane, Z1, according to the invention can typically have a thickness varying between 4 and 25 mm, preferably between 5 mm and 19 mm, more preferably between 6 mm and 10 mm. Furthermore, in a preferred embodiment of the present invention, the thickness of the first pane of the asymmetric VIG, Z1, is equal to or greater than 4 mm, (Z1≥4 mm), preferably equal to or greater than 5 mm, (Z1≥5 mm), more preferably equal to or greater than 6 mm, (Z1≥6 mm).

As illustrated in Tables 1A and 1B below, the combined stress of vacuum-insulated glazing unit of the same size, comprising the same discrete spacers positioned between the glass panes at the same pitch, and being of the same overall thickness (=Z1+Z2), have been calculated, as described above for a $\Delta T=40°$ C., and the mean temperature of the first pane being lower than the mean temperature of the second pane (T1<T2), for two different embodiments: one configuration is a symmetric VIG wherein the first and second glass panes are of the same thickness and the second configuration is an asymmetric VIG wherein the thickness of the first glass pane, Z1, is thicker than the thickness of the second glass pane, Z2.

TABLE 1A

| | Symmetric VIG configuration (Comparative) | | Asymmetric VIG Configuration (Within invention) | |
|---|---|---|---|---|
| Thickness | Z1 = 5 mm | Z2 = 5 mm | Z1 = 7 mm | Z2 = 3 mm |
| Pitch | $\lambda$ = 20 mm | $\lambda$ = 20 mm | $\lambda$ = 20 mm | $\lambda$ = 20 mm |
| Ratio Z1/Z2 | | 1 | | 2.33 |
| Thermal stress | $\sigma_{\Delta T}$ = 0 MPa | $\sigma_{\Delta T}$ = 9.15 MPa | $\sigma_{\Delta T}$ = 0 MPa | $\sigma_{\Delta T}$ = 2.16 MPa |
| Atmospheric stress | $\sigma_p$ = 1.76 MPa | $\sigma_p$ = 1.76 MPa | $\sigma_p$ = 0.90 MPa | $\sigma_p$ = 4.89 MPa |
| Combined stress | $\sigma_{comb}$ = 1.76 MPa | $\sigma_{comb}$ = 10.91 MPa | $\sigma_{comb}$ = 0.90 MPa | $\sigma_{comb}$ = 7.05 MPa |

As shown in table 1A above, the maximum combined stress obtained for the asymmetric VIG of the present invention has been reduced to 7.05 MPa whereas the corresponding symmetric VIG demonstrates a higher maximum combined stress of 10.91 MPa in the tested conditions.

TABLE 1B

| | Symmetric VIG configuration (Comparative) | | Asymmetric VIG Configuration (Within invention) | |
|---|---|---|---|---|
| Thickness | Z1 = 5 mm | Z2 = 5 mm | Z1 = 7 mm | Z2 = 3 mm |
| Pitch | $\lambda$ = 26 mm | $\lambda$ = 26 mm | $\lambda$ = 26 mm | $\lambda$ = 26 mm |
| Ratio Z1/Z2 | | 1 | | 2.33 |
| Thermal stress | $\sigma_{\Delta T}$ = 0 MPa | $\sigma_{\Delta T}$ = 9.15 MPa | $\sigma_{\Delta T}$ = 0 MPa | $\sigma_{\Delta T}$ = 2.16 MPa |
| Atmospheric stress | $\sigma_p$ = 2.97 MPa | $\sigma_p$ = 2.97 MPa | $\sigma_p$ = 1.52 MPa | $\sigma_p$ = 8.26 MPa |
| Combined stress | $\sigma_{comb}$ = 2.97 MPa | $\sigma_{comb}$ = 12.12 MPa | $\sigma_{comb}$ = 1.52 MPa | $\sigma_{comb}$ = 10.42 MPa |

As shown in table 1B, the maximum combined stress obtained for the asymmetric VIG of the present invention has been reduced to 10.42 MPa whereas the corresponding symmetric VIG demonstrates a higher maximum combined stress of 12.12 MPa in the tested conditions.

Criticality of the Pitch

FIG. 4 illustrates that the criticality of the pitch dimension, $\lambda$, i.e. the interval between the discrete spacers positioned between the first and second glass panes and maintaining a distance between them. It has been surprisingly found that a pitch, $\lambda$, comprised between 10 mm and 26 mm is critical to obtain the benefit of reduced combined stress of the asymmetric configuration of VIG of the present invention versus the corresponding symmetric VIG.

The combined stress has been calculated for a symmetric and an asymmetric VIG having a pitch dimension outside the values claimed in the present invention. The thermal induced stress and atmospheric induced stress have been calculated as described above, in the same conditions.

As shown in FIG. 4, the maximum combined stress obtained for the asymmetric VIG reaches 14.67 MPa whereas the corresponding symmetric VIG demonstrates a maximum combined stress of 13.65 MPa. Therefore, this example illustrates that a pitch value equal to or lower than 26 mm is critical for the asymmetric VIG to perform better than the corresponding symmetric VIG of the same overall thickness.

Criticality of Z2

FIG. 5 illustrates the criticality of the thickness of the second pane, Z2. It has been surprisingly found that the thickness, Z2, of the second glass pane, equal to or greater than 3 mm (Z2≥3 mm) is critical to obtain the benefit of reduced combined stress of the asymmetric configuration of VIG of the present invention versus the corresponding symmetric VIG.

The combined stress has been calculated for a symmetric and an asymmetric VIG wherein the thickness of the second pane is outside claimed range in the present invention. The thermal induced stress and atmospheric induced stress have been calculated as described above, in the same conditions.

As shown in FIG. 5, the maximum combined stress obtained for the asymmetric VIG outside of the scope of the present invention reaches 18.59 MPa whereas the corresponding symmetric VIG demonstrates a maximum combined stress of 10.98 MPa. Therefore, this example illustrates that the thickness of the second pane, Z2, equal to or greater than 3 mm, is critical for the asymmetric VIG to perform better than the corresponding symmetric VIG of the same overall thickness.

Partition

The asymmetric VIG of the present invention is typically used to close an opening within a partition such as in general-purpose glazing units, a build wall, automotive glazing units or architectural glazing units, appliances . . . . Typically a partition separating the exterior space from the interior space of a building. Preferably, the asymmetric VIG of the present invention will close an opening of a partition separating an exterior space from an interior space, whereby the first glass pane of the asymmetric of the VIG is facing the exterior space. This partition separates a first space characterized by a first temperature, Temp1, from a second space defined by a second temperature, Temp2, wherein the Temp1 is lower than Temp2. The temperature of the interior space is typically from 20 to 25° C. whereas the temperature of the exterior space can extend from −20° C. in the winter to +35° C. in the summer. Therefore, the temperature difference between the interior space and the exterior space can typically reach more than 40° C. in severe conditions. The temperature of each glass pane of the asymmetric VIG of the present invention, (T1, T2) will reflect the temperature of the corresponding space (Tempt Temp2). If the asymmetric VIG of the present invention is positioned so that its first glass pane is facing the first space, the temperature of said first glass pane (T1) will reflect the temperature of the first space (Temp1) and the temperature of the second glass pane (T2) will reflect the temperature of the second space (Temp2) and vice-versa.

Thermal induced stress occurs as soon as there is a temperature difference between the first glass pane (1 and T1) and the second glass panes (2 and T2) and increases with increasing differences between T1 and T2. The temperature difference ($\Delta$T) is the absolute difference between the mean temperature T1 calculated for the first glass pane (1) and the mean temperature T2 calculated for the second glass pane (2). The mean temperature of a glass pane is calculated from numerical simulations known to the skilled people. Thermal induced stress becomes even more problematic—up to breaking the VIG, when such absolute temperature differences between the glass panes reaches 20° C. and becomes critical when such absolute temperature difference is higher than 30° C. and reaches 40° C. in severe conditions.

In a preferred embodiment, the asymmetric VIG of the present invention will close an opening of a partition separating a first space with a first temperature, Tempt, from a second space with a second temperature, Temp2, wherein Temp1 is lower than Temp2. The first glass pane of the asymmetric of the VIG is facing the first space so that the first pane (1) with a thickness, Z1, greater than the thickness of the second pane (2), Z2, is facing the first space having a lower temperature (Temp1) than the temperature of the second space (Temp2). Indeed, it has been found that to maximize the technical advantages of the asymmetric VIG of the present invention, it is preferred to expose the first glass pane (1) with a thickness Z1 greater than the thickness of the second glass pane, Z2; to the "cold side", i.e., to the space having the lowest temperature (Temp1).

The present invention also relates to the use of an asymmetric vacuum insulated glazing unit as defined above, to close the opening of the partition separating a first space with a first temperature, Tempt, from a second space with a second temperature, Temp2, wherein Temp 1 is lower than Tempt, and wherein the first glass pane is facing the first space, preferably the first glass pane is facing the exterior space.

Glass Panes

The first and second panes of the vacuum-insulated glazing unit (VIG) according to the invention are float annealed glass panes (1, 2). The term "glass" is herein understood to mean any type of glass or equivalent transparent material, such as a mineral glass or an organic glass. The mineral glasses used may be irrespectively one or more known types of glass such as soda-lime-silica, aluminosilicate or borosilicate, crystalline and polycrystalline glasses. The term "float glass pane" is understood to mean a glass pane formed by the float process, which is well known in the art. Float glass panes present lower production costs.

The first glass pane has a coefficient of thermal expansion, CET1, and the second glass pane has a coefficient of thermal expansion, CET2, whereby the absolute difference between CET1 and CET2 is equal to or at most 0.40 10-6/° C. (|CET1−CET2|≤0.40 10-6/° C.); preferably is at most 0.30 10-6/° C. (|CET1−CET2|≤0.30 10-6/° C.), more preferably equal to or at most 0.20 10-6/° C. (|CET1−CET2|≤0.20 10-6/° C.). Ideally, the first and second glass panes have the same coefficient of thermal expansion. The term "coefficient of thermal expansion" (CTE) is a measure of how the size of an object changes with a change in temperature. Specifically, it measures the fractional change in volume of the glass pane per degree change in temperature at a constant pressure.

As known to persons skilled in the art, glass is an elastic material generally characterized by its Young's modulus, E, and Poisson's ratio, $\mu$. The young's modulus is a measure of the stiffness whereby larger values indicate glasses that will hardly deform under applied stress. Typical values of the Young's modulus for soda-lime-silica, aluminosilicate or borosilicate glass compositions are comprised between 60 and 120 GPa (60 GPa≤E≤120 GPa). In particular, soda-lime glass compositions present a Young's modulus value generally in the range from 69 to 72 GPa (60 GPa≤E≤72 GPa). The Poisson's ratio measures the Poisson effect, being a phenomenon whereby glass tend to expand in directions perpendicular to the direction of compression. Typical values of the Poisson's ratio for soda-lime-silica, aluminosilicate or borosilicate glass compositions are comprised between 0.18 and 0.30 (0.18≤$\mu$≤0.30). In particular, soda-lime glass compositions present Poisson's ratio values generally in the range from 0.18 to 0.23 (0.18≤$\mu$≤0.23).

The term "annealed glass pane" is understood to mean a glass pane produced by slowly cooling the hot glass panes after they have been formed, to relieve residual internal stresses introduced during manufacture.

The float glass panes may optionally be edge-ground. Edge grinding renders sharp edges into smooth edges which are much safer for people who may come in contact with the vacuum-insulating glazing, in particular with the edge of the glazing.

Preferably, the composition for the first and second float glass panes of the asymmetric VIG of the invention comprises the following components in weight percentage, expressed with respect to the total weight of glass (Comp. A). More preferably, the glass composition (Comp. B) is a soda-lime-silicate-type glass with a base glass matrix of the composition comprising the following components in weight percentage, expressed with respect to the total weight of glass.

|  | Comp. A | Comp. B |
|---|---|---|
| SiO2 | 40-78% | 60-78 wt % |
| Al2O3 | 0-18% | 0-8 wt %, pref 0-6 wt % |
| B2O3 | 0-18% | 0-4 wt %, pref 0-1 wt % |
| Na2O | 0-20% | 5-20 wt %, pref 10-20 wt % |
| CaO | 0-15% | 0-15 wt %, pref 5-15 wt % |
| MgO | 0-10% | 0-10 wt %, pref 0-8 wt % |
| K2O | 0-10% | 0-10 wt % |
| BaO | 0-5% | 0-5 wt %, pref 0-1 wt %. |

Other preferred glass compositions for the first and second float glass panes of the asymmetric VIG of the invention, comprises the following components in weight percentage, expressed with respect to the total weight of glass:

| Comp. C | Comp. D | Comp. E |
|---|---|---|
| 65 ≤ SiO2 ≤ 78 wt % | 60 ≤ SiO2 ≤ 78% | 65 ≤ SiO2 ≤ 78 wt % |
| 5 ≤ Na2O ≤ 20 wt % | 5 ≤ Na2O ≤ 20% | 5 ≤ Na2O ≤ 20 wt % |
| 0 ≤ K2O < 5 wt % | 0.9 < K2O ≤ 12% | 1 ≤ K2O < 8 wt % |
| 1 ≤ Al2O3 < 6 wt %, pref 3 < Al2O3 ≤ 5% | 4.9 ≤ Al2O3 ≤ 8% | 1 ≤ Al2O3 < 6 wt % |
| 0 ≤ CaO < 4.5 wt % | 0.4 < CaO < 2% | 2 ≤ CaO < 10 wt % |
| 4 ≤ MgO ≤ 12 wt % | 4 < MgO ≤ 12% | 0 ≤ MgO ≤ 8 wt % |
| (MgO/(MgO + CaO)) ≥ 0.5, pref 0.88 ≤ [MgO/(MgO + CaO)] < 1. |  | K2O/(K2O + Na2O):0.1-0.7. |

In particular, examples of base glass matrixes for the composition according to the invention are described published in PCT patent applications WO2015/150207A1, WO2015/150403A1, WO2016/091672 A1, WO2016/169823A1 and WO2018/001965 A1.

Another preferred glass composition for the first and second float glass panes of the asymmetric VIG of the invention, comprises the following in weight percentage, expressed with respect to the total weight of glass:

| | |
|---|---|
| $SiO_2$ | 60-78% |
| $Al_2O_3$ | 0-8% |
| $B_2O_3$ | 0-4% |
| $Na_2O$ | 5-20%, pref 10-20 wt % |
| CaO | 0-15% |
| MgO | 0-12% |
| $K_2O$ | 0-10% |
| BaO | 0-5%. |

The float glass panes can be of the same dimensions or of different dimensions and form thereby a stepped VIG. In a preferred embodiment of the present invention, the first and the second float glass panes comprise first and second peripheral edges, respectively and wherein the first peripheral edges are recessed from the second peripheral edges or wherein the second peripheral edges are recessed from the first peripheral edges. This configuration allows to reinforce the strength of the hermetically bonding seal.

Within the VIG, the first glass pane has an inner pane face (12) and an outer pane face (13). The second glass pane has an inner pane face (22) and an outer pane face (23). The first and second inner pane faces are facing the internal volume, V, of the asymmetric VIG. The first and second outer pane faces are facing the exterior of the VIG.

In some embodiment of the present invention, films such as low emissivity films, solar control films (a heat ray reflection films), anti-reflective films, anti-fog films, preferably a heat ray reflection film or a low emissivity film, can be provided on at least one of the inner pane faces (12, 22) and/or outer pane faces (13, 23) of the first and/or second float glass panes (1, 2) of the vacuum-insulated glazing unit (10). In a preferred embodiment of the present invention such as shown in FIG. 1, the inner pane faces (22) of the second float glass panes (2) of the asymmetric VIG is provided with a heat ray reflection film or a low-E film (5).

Laminated Assembly

In one embodiment of the present invention, the outer pane face of the first and/or of the second glass pane may be further laminated to at least one glass sheet by at least one polymer interlayer forming a laminated assembly, for safety and security reasons. Laminated glass is a type of safety glass that holds together when shattered. In the event of breaking, it is held in place by a thermoplastic interlayer between its two or more layers of glass. The interlayer keeps the layers of glass bonded even when broken, and its high strength prevents the glass from breaking up into large sharp pieces.

Within the laminate assembly, the at least one glass sheet preferably has a thickness, Zs, equal to or greater than 0.5 mm ($Zs \geq 0.5$ mm). The thickness is measured in the direction normal to the pane, P. The at least one polymer interlayer is a transparent or translucent polymer interlayer comprising a material selected from the group consisting ethylene vinyl acetate (EVA), polyisobutylene (PIB), polyvinyl butyral (PVB), polyurethane (PU), polyvinyl chlorides (PVC), polyesters, copolyesters, polyacetals, cyclo olefin polymers (COP), ionomer and/or an ultraviolet activated adhesive and others known in the art of manufacturing glass laminates. Blended materials using any compatible combination of these materials can be suitable, as well. Reinforced acoustic insulation with acoustic laminated glass are also compatible with the present concept to improve the performances of the window or door. In such case, the polymer interlayer comprises at least one additional acoustic material inserted between two polyvinyl butyral films.

Glass panes with electrochromic, thermochromic, photochromic or photovoltaic elements are also compatible with the present invention.

Multiple Insulating Glazing

In another embodiment of the present invention, the present invention also applies to any type of glazing unit comprising glass panes (two, three or more) bounding insulating or non-insulating internal spaces (also called multiple glazing units) provided that a partial vacuum is generated in at least one of these internal spaces. Therefore, in one embodiment, to improve the mechanical performances of the asymmetric VIG of the present invention, a third additional glass pane can be coupled to at least one of the outer pane faces (13 and/or 23) of the first and second glass pane along the periphery of the VIG via a peripheral spacer bar, also known as a spacer window profile, creating in insulating cavity sealed by a peripheral edge seal. Said peripheral spacer bar maintained a certain distance between the third glass pane and the at least one of the outer pane face one of the first and second glass panes. Typically said spacer bar comprises a dessicant and has typically a thickness comprised between 6 mm to 20 mm, preferably 9 to 15 mm. In general, said second internal volume is filled with a predetermined gas selected from the group consisting of air, dry air, argon (Ar), krypton (Kr), xenon (Xe), sulfur hexafluoride (SF6), carbon dioxide or a combination thereof. Said predetermined gas are effective for preventing heat transfer and/or may be used to reduced sound transmission.

Spacers

As depicted in FIG. 1, the vacuum-insulated glazing unit of the present invention comprises a plurality of discrete spacers (3)—also referred to as "pillars", sandwiched between the first and second float glass panes (1, 2) so as to maintain the internal volume, V. As per invention, the discrete spacers are positioned between the first and second glass panes, maintaining a distance between the first and the second glass panes and forming an array having a pitch, λ, comprised between 10 mm and 26 mm (10 mm≤λ≤26 mm). By pitch, it is meant the interval between the discrete spacers. The array within the present invention is typically a regular array based on an equilateral triangular, square or hexagonal scheme, preferably based on a square scheme.

The discrete spacers can have different shapes, such as cylindrical, spherical, filiform, hourglass shape, C-shaped, cruciform, prismatic shape. It is preferred to use small pillars, i.e. pillars having in general a contact surface to the glass pane, defined by its external circumference, equal to or lower than 5 $mm^2$, preferably equal to or lower than 3 $mm^2$, more preferably equal to or lower than 1 $mm^2$. As indicated above, these dimensions may offer a good mechanical resistance whilst being aesthetically discreet.

The discrete spacers are typically made of a material having a strength endurable against pressure applied from the surfaces of the glass panes, capable of withstanding high-temperature process such as burning and baking, and hardly emitting gas after the glass panel is manufactured. Such a material is preferably a hard metal material, quartz glass or a ceramic material, in particular, a metal material such as iron, tungsten, nickel, chrome, titanium, molybdenum, carbon steel, chrome steel, nickel steel, stainless steel, nickel-chromium steel, manganese steel, chromium-manganese steel, chromium-molybdenum steel, silicon steel, nichrome, duralumin or the like, or a ceramic material such as corundum, alumina, mullite, magnesia, yttria, aluminum nitride, silicon nitride or the like.

Hermetically Bonding Seal

As shown in FIG. 1, the internal volume, V, between the glass panes (1, 2) of the vacuum-insulated glazing unit (10) of the present invention is closed with a hermetically bonding seal (4) placed on the periphery of the glass panes around said internal space. The said hermetically bonding seal is impermeable and hard. Such as used here and unless otherwise indicated, the term "impermeable" is understood to mean impermeable to air or any other gas present in the atmosphere.

Temperature gradient between interior and exterior spaces cause indeed different thermal deformation of the first and second glass panes of the present invention. The constraints on each glass pane are even more critical when the sealing placed on the periphery of the glass panes are hard. A contrario, such constraints will be lower within VIGs wherein the peripheral seal allows for some deformation.

Various hermetically bonding seal technologies exist. A first type of seal (the most widespread) is a seal based on a solder glass for which the melting point is lower than that of the glass of the glass panels of the glazing unit. The use of this type of seal limits the choice of low-E layers to those that are not degraded by the thermal cycle required to implement the solder glass, i.e. to those that are able to withstand a temperature possibly as high as 250° C. In addition, since this type of solder-glass-based seal is only very slightly deformable, it does not allow the effects of differential expansion between the interior-side glass pane of the glazing unit and the exterior-side glass pane of the glazing unit when said panes are subjected to large temperature differences to be absorbed. Quite substantial stresses are therefore generated at the periphery of the glazing unit and may lead to breakage of the glass panes of the glazing unit.

A second type of seal comprises a metal seal, for example a metal strip of a small thickness (<500 μm) soldered to the periphery of the glazing unit by way of a tie underlayer covered at least partially with a layer of a solderable material such as a soft tin-alloy solder. One substantial advantage of this second type of seal relative to the first type of seal is that it is able to partially deform in order to partially absorb the differential expansion created between the two glass panes. There are various types of tie underlayers on the glass pane.

Patent application WO 2011/061208 A1 describes one example embodiment of a peripheral impermeable seal of the second type for a vacuum-insulated glazing unit. In this embodiment, the seal is a metal strip, for example made of copper that is soldered by means of a solderable material to an adhesion band provided on the periphery of the glass panes.

Internal Volume

A vacuum of absolute pressure less than 0.1 mbar, preferably less than 0.01 mbar is created, within the internal volume, V, defined by the first and second glass panes and the set of discrete spacers and closed by the hermetically bonding seal within the asymmetric VIG of the present invention.

The internal volume of the asymmetric VIG of the present invention, can comprise a gas, for example, but not exclusively, air, dry air, argon (Ar), krypton (Kr), xenon (Xe), sulfur hexafluoride (SF 6), carbon dioxide or a combination thereof. The transfer of energy through an insulating pane having this conventional structure is decreased, because of the presence of the gas in the internal volume, relative to a single glass pane.

The internal volume may also be pumped of any gas, creating therefore a vacuum glazing unit. Energy transfer through a vacuum-insulated insulating glazing pane is greatly decreased by the vacuum. To generate the vacuum in the internal space of the glazing pane, a hollow glass tube bringing the internal space into communication with the exterior is generally provided on the main face of one of the glass panes. Thus, the partial vacuum is generated in the internal space by pumping out gases present in the internal space by virtue of a pump connected to the exterior end of the glass tube.

To maintain for the duration a given vacuum level in a vacuum-insulated glazing unit, a getter may be used in the glazing unit. Specifically, the internal surfaces of the glass panes making up the glazing pane may release over time gases absorbed beforehand in the glass, thereby increasing the internal pressure in the vacuum-insulated glazing unit and thus decreasing the vacuum performance. Generally, such a getter consists of alloys of zirconium, vanadium, iron, cobalt, aluminum, etc., and is deposited in the form of a thin layer (a few microns in thickness) or in the form of a block placed between the glass panes of the glazing pane so as not to be seen (for example hidden by an exterior enamel or by a portion of the peripheral impermeable seal). The getter forms, on its surface, a passivation layer at room temperature, and must therefore be heated in order to make the passivation layer disappear and thus activate its alloy gettering properties. The getter is said to be "heat activated".

| Ref. # | Feature |
|---|---|
| 10 | Vacuum-insulated glazing |
| 1 | First glass pane |
| 12 | Inner pane face of the first glass pane |
| 13 | Outer pane face of the first glass pane |
| 2 | Second glass pane |
| 22 | Inner pane face of the second glass pane |
| 23 | Outer pane face of the second glass pane |
| 3 | Discrete spacers |
| 4 | Hermetically bonding seal |
| 5 | Heat ray reflection film or Low emissivity film |
| V | Internal volume |

The invention claimed is:

1. A vacuum insulating glazing unit extending along a plane, P, defined by a longitudinal axis, X, and a vertical axis, Z; the vacuum insulating glazing unit having a width, W, measured along the longitudinal axis, X, and a length, L, measured along the vertical axis, Z, and comprising:

a first glass pane having a thickness Z1, and a second glass pane having a thickness, Z2, wherein the thicknesses are measured in a direction normal to the plane, P, wherein Z1 is greater than Z2, wherein the first and second glass panes are float annealed glass panes; and wherein the first glass pane has a coefficient of thermal expansion, CTE1, and the second glass pane has a coefficient of thermal expansion, CTE2, and an absolute difference between CTE1 and CTE2 is at most $0.40*10^{-6}/°$ C.;

a set of discrete spacers positioned between the first and second glass panes, maintaining a distance between the first and second glass panes and forming an array having a pitch, λ;

a hermetically bonding seal sealing the distance between the first and second glass panes over a perimeter thereof;

an internal volume, V, defined by the first and second glass panes and the set of discrete spacers and closed by the hermetically bonding seal, the internal volume, V, having an absolute vacuum pressure of less than 0.1 mbar, wherein the length of the vacuum insulating glazing unit, L, is equal to or greater than 300 mm;

wherein the thickness of the second glass pane, Z2, is equal to or greater than 3 mm;

wherein a thickness ratio, Z1/Z2, of the thickness of the first glass pane, Z1, to the thickness of the second glass pane, Z2, is equal to or greater than 1.30, and greater than Z1/(Z1−2.10), and wherein the pitch, λ, is 10 mm to 26 mm.

2. The vacuum insulating glazing unit according to claim 1, wherein the length of the vacuum insulating glazing unit, L, is equal to or greater than 400 mm.

3. The vacuum insulating glazing unit according to claim 1, wherein the thickness ratio, Z1/Z2, is equal to or greater than 1.55.

4. The vacuum insulating glazing unit according to claim 1, wherein the pitch, λ, is 15 mm to 25 mm.

5. The vacuum insulating glazing unit according to claim 1, wherein the width of the vacuum insulating glazing unit, W, is equal to or greater than 300 mm.

6. The vacuum insulating glazing unit according to claim 1, wherein at least one of the first and second glass panes is made from soda-lime-silica glass, aluminosilicate glass or borosilicate glass.

7. The vacuum insulating glazing unit according to claim 6, wherein the second glass pane comprises the following in weight percentage, expressed with respect to a total weight of glass:

| | |
|---|---|
| $SiO_2$ | 60 to 78 wt %, |
| $Al_2O_3$ | 0 to 8 wt %, |
| $B_2O_3$ | 0 to 4 wt %, |
| $Na_2O$ | 5 to 20 wt %, |
| CaO | 0 to 15 wt %, |
| MgO | 0 to 12 wt %, |
| $K_2O$ | 0 to 10 wt %, and [[−10%]] |
| BaO | 0 to 5 wt %. |

8. The vacuum insulating glazing unit according to claim 1, wherein the absolute difference between CTE1 and CTE2 is at most $0.30*10^{-6}/°$ C.

9. The vacuum insulating glazing unit according to claim 1, wherein the first and second glass panes each have an inner pane face and an outer pane face, wherein the inner pane faces of both the first and second glass panes face the internal volume, V, and wherein at least one of the inner faces and/or outer faces of the first and/or second glass panes has at least a heat ray reflection film or a low-emissivity film.

10. The vacuum insulating glazing unit according to claim 1, wherein the first and second glass panes each have an outer pane face, and at least one of the outer pane faces of the first and second glass panes is laminated to at least one glass sheet by at least one polymer interlayer forming a laminated assembly.

11. The vacuum insulating glazing unit according to claim 1, wherein the first and second glass panes each have an outer pane face, and at least one of the outer pane faces of the first and second glass panes is coupled to a third glass pane along a periphery of the vacuum insulating glazing unit via a peripheral spacer bar, creating an insulating cavity sealed by a peripheral edge seal.

12. The vacuum insulating glazing unit according to claim 1, wherein the first and second glass panes each have first and second peripheral edges, and the first peripheral edges are recessed from the respective second peripheral edges or the second peripheral edges are recessed from the respective first peripheral edges.

13. A partition separating a first space with a first temperature, Temp1, from a second space with a second temperature, Temp2, wherein Temp 1 is lower than Temp2; the partition comprising:

an opening closed by the vacuum insulating glazing unit according to claim 1, wherein the first glass pane faces the first space.

14. A method of closing a partition, the method comprising:

placing a vacuum insulated glazing unit according to claim 1 on an opening of a partition, wherein the partition defines a first space with a first temperature, Temp 1, and a second space with a second temperature, Temp2, wherein Temp 1 is lower than Temp2, and wherein the first glass pane faces the first space.

* * * * *